(12) United States Patent
Yang et al.

(10) Patent No.: US 11,313,550 B2
(45) Date of Patent: Apr. 26, 2022

(54) LIGHT GUIDING COLUMN WITH A WATERPROOFING FUNCTION, ELECTRONIC DEVICE WITH THE LIGHT GUIDING COLUMN, METHOD OF MANUFACTURING THE LIGHT GUIDING COLUMN

(71) Applicant: Moxa Inc., New Taipei (TW)

(72) Inventors: Mao-Hung Yang, New Taipei (TW); Chih-Hou Chien, New Taipei (TW)

(73) Assignee: Moxa Inc., New Taipei (TW)

( * ) Notice: Subject to any disclaimer, the term of this patent is extended or adjusted under 35 U.S.C. 154(b) by 0 days.

(21) Appl. No.: 16/934,036

(22) Filed: Jul. 21, 2020

(65) Prior Publication Data

US 2021/0293404 A1  Sep. 23, 2021

(30) Foreign Application Priority Data

Mar. 23, 2020 (TW) .................................. 109109542

(51) Int. Cl.
*F21V 31/00* (2006.01)
*F21V 15/01* (2006.01)
*F21V 8/00* (2006.01)

(52) U.S. Cl.
CPC ............ *F21V 31/005* (2013.01); *F21V 15/01* (2013.01); *G02B 6/0093* (2013.01)

(58) Field of Classification Search
CPC ...... F21V 31/005; F21V 15/01; G02B 6/0093
See application file for complete search history.

(56) References Cited

FOREIGN PATENT DOCUMENTS

| CN | 1751842 A | 3/2006 | |
|---|---|---|---|
| CN | 102950836 A * | 3/2013 | ............ B32B 27/32 |
| CN | 104791741 A * | 7/2015 | |
| CN | 205491487 U * | 8/2016 | |
| CN | 106939982 A * | 7/2017 | ............ F21V 19/00 |
| CN | 208418542 U * | 1/2019 | |
| CN | 210109380 U | 2/2020 | |
| TW | M399292 U1 | 3/2011 | |

* cited by examiner

*Primary Examiner* — Mary Ellen Bowman
(74) *Attorney, Agent, or Firm* — Winston Hsu

(57) ABSTRACT

A light guiding column is with a waterproofing function and for guiding light emitted from a light emitting component to outside of a case. The light emitting component is disposed on a base plate. The base plate is disposed inside the case. The light guiding column includes a first end portion and a second end portion. The first end portion passes through a through hole formed on the case in a tight-fitting manner. The second end portion is opposite to the first end portion and clamped between the base plate and the case in a tight-fitting manner. A chamber is formed between the second end portion and the base plate, and the light emitting component is accommodated inside the chamber. The present invention can reduce an amount of components for assembly to reduce manufacturing cost and difficulty in assembly.

20 Claims, 7 Drawing Sheets

LIGHT GUIDING COLUMN WITH A WATERPROOFING FUNCTION, ELECTRONIC DEVICE WITH THE LIGHT GUIDING COLUMN, METHOD OF MANUFACTURING THE LIGHT GUIDING COLUMN

BACKGROUND OF THE INVENTION

1. Field of the Invention

The present invention relates to a light guiding column, a related electronic device and a related manufacturing method, and more particularly, to a light guiding column with a waterproofing function, an electronic device with the light guiding column and a method of manufacturing the light guiding column.

2. Description of the Prior Art

In order to improve user experience, an electronic device is usually equipped with a light indicator which includes a light emitting component disposed inside a case for emitting light and a light guiding component for guiding the light emitted from the light emitting component to the outside of the case, so that a user can recognize a current operating state of the electronic device by observing the light indicator, which allows the user to take a countermeasure when a failure happens. However, there is usually a gap formed between the light guiding component and the case, and therefore, liquid, e.g. water, might enter into the case through the gap easily, which causes damage of internal electrical components inside the case due to exposure to the liquid. Currently, some electronic devices use a waterproofing washer disposed between the light guiding component and the case or waterproofing glue filled between the light guiding component and the case, but such configuration not only increases manufacturing cost but also causes difficulty in assembly.

SUMMARY OF THE INVENTION

Therefore, it is an objective of the present invention to provide a light guiding column with a waterproofing function, an electronic device with the light guiding column and a method of manufacturing the light guiding column for solving the aforementioned problem.

In order to achieve the aforementioned objective, the present invention discloses a light guiding column with a waterproofing function for guiding light emitted from a light emitting component to outside of a case. The light emitting component is disposed on a base plate. The base plate is disposed inside the case. The light guiding column includes a first end portion and a second end portion. The first end portion passes through a through hole formed on the case in a tight-fitting manner. The second end portion is opposite to the first end portion and clamped between the base plate and the case in a tight-fitting manner. A chamber is formed between the second end portion and the base plate, and the light emitting component is accommodated inside the chamber.

According to an embodiment of the present invention, at least one abutting structure protrudes from the first end portion of the light guiding column, and the at least one abutting structure abuts against an outer side of the case away from the base plate for restraining movement of the light guiding column.

According to an embodiment of the present invention, the second end portion abuts against the case and the base plate in a tight-fitting manner.

According to an embodiment of the present invention, a protruding platform protrudes from an inner side of the case adjacent to the base plate. The through hole penetrates through the protruding platform, and the protruding platform and the base plate respectively abut against a first abutting portion of the second end portion and a second abutting portion of the second end portion opposite to the first abutting portion of the second end portion, so that the second end portion is clamped by the case and the base plate.

According to an embodiment of the present invention, at least one portion of an outer periphery of the first end portion of the light guiding column interferes with at least one portion of an inner periphery of the through hole, so that the first end portion is disposed in the through hole in a tight-fitting manner.

According to an embodiment of the present invention, an outer diameter of a first portion of the first end portion away from the second end portion is less than an outer diameter of a second portion of the first end portion adjacent to the second end portion.

According to an embodiment of the present invention, the first end portion is a truncated cone, and the second end portion is a cylinder.

According to an embodiment of the present invention, a notch structure is formed on a side of the second end portion adjacent to the base plate, and the notch structure and the base plate form the chamber cooperatively.

According to an embodiment of the present invention, the light guiding column is made of resilient and light guiding material.

According to an embodiment of the present invention, the light guiding column is made of silicone rubber.

Furthermore, the present invention further discloses an electronic device includes the aforementioned case, the aforementioned base plate, the aforementioned light emitting component and the aforementioned light guiding column.

Furthermore, the present invention further discloses a method of manufacturing the aforementioned light guiding column. The method includes finishing a surface of a mold cavity; and pouring resilient and light guiding material into the mold cavity to form the light guiding column.

According to an embodiment of the present invention, finishing the surface of the mold cavity includes finishing the surface of the mold cavity by electroplating.

According to an embodiment of the present invention, pouring the resilient and light guiding material into the mold cavity to form the light guiding column includes pouring silicone rubber into the mold cavity to form the light guiding column.

In summary, the present invention utilizes the light guiding column made of the resilient and light guiding material to pass through the through hole in the tight-fitting manner and to be clamped between the base plate and the case in the tight-fitting manner. Therefore, the present invention not only can guide the light emitted from the light emitting component to the outside of the case and prevent liquid, e.g., water, from entering into the case through the through hole but also can reduce manufacturing cost and difficulty in assembly because the present invention reduces an amount of components for assembly.

These and other objectives of the present invention will no doubt become obvious to those of ordinary skill in the art after reading the following detailed description of the preferred embodiment that is illustrated in the various figures and drawings.

DETAILED DESCRIPTION

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. Accordingly, the drawings and descriptions will be regarded as illustrative in nature and not as restrictive.

Figure 1:
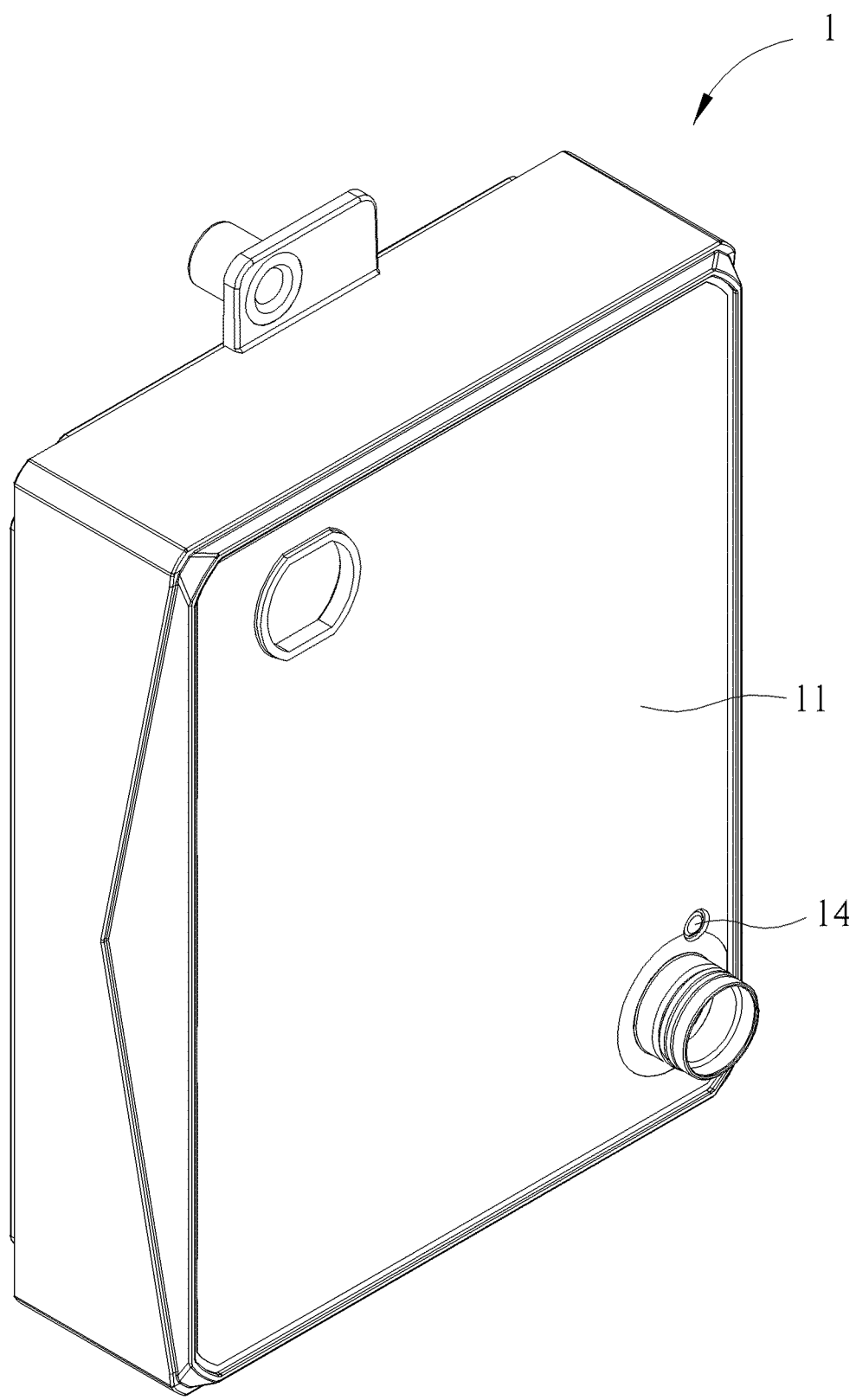
FIG. 1 is a schematic diagram of an electronic device according to a first embodiment of the present invention.
Figure 2:
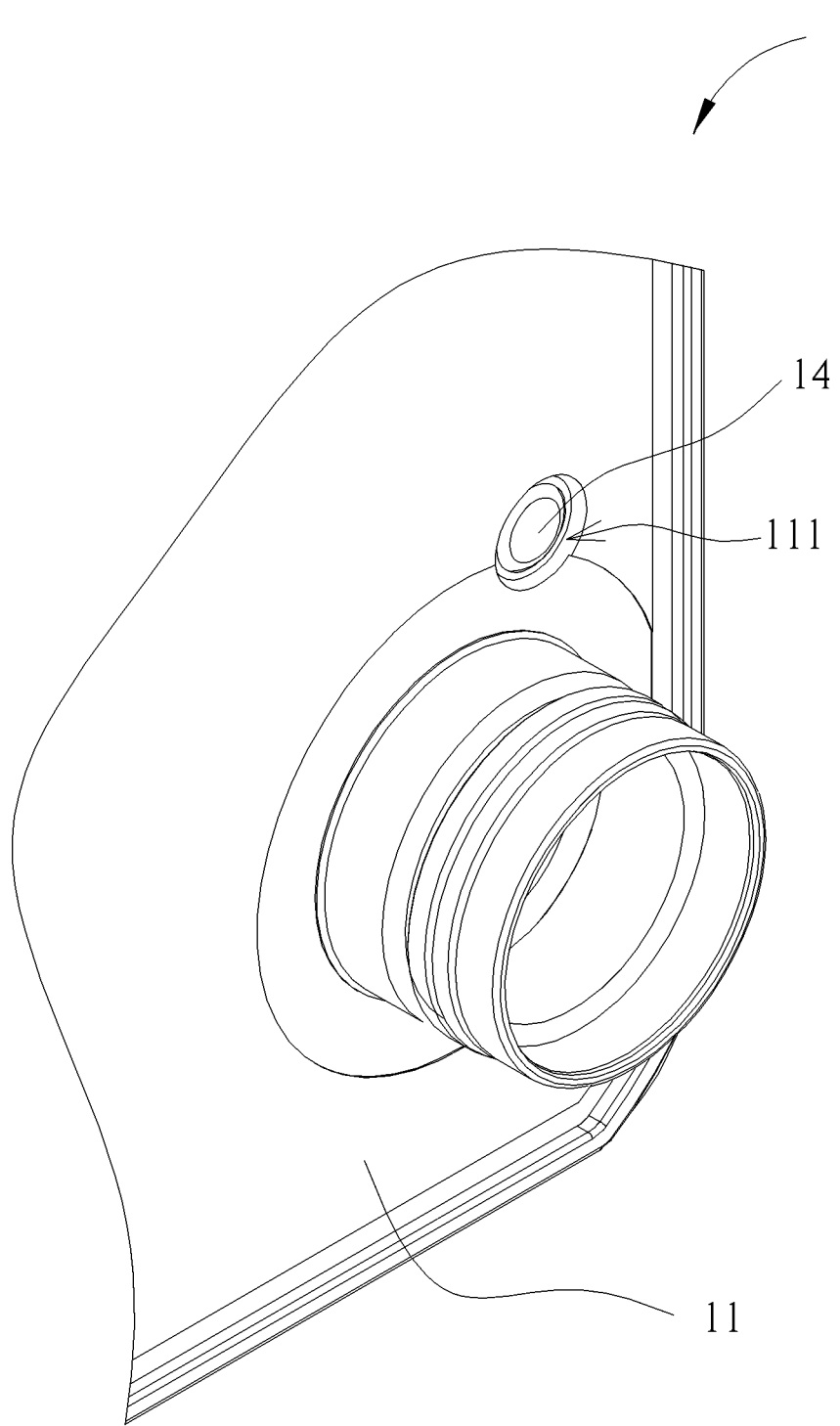
FIG. 2 is a partial enlarged diagram of the electronic device according to the first embodiment of the present invention.
Figure 3:
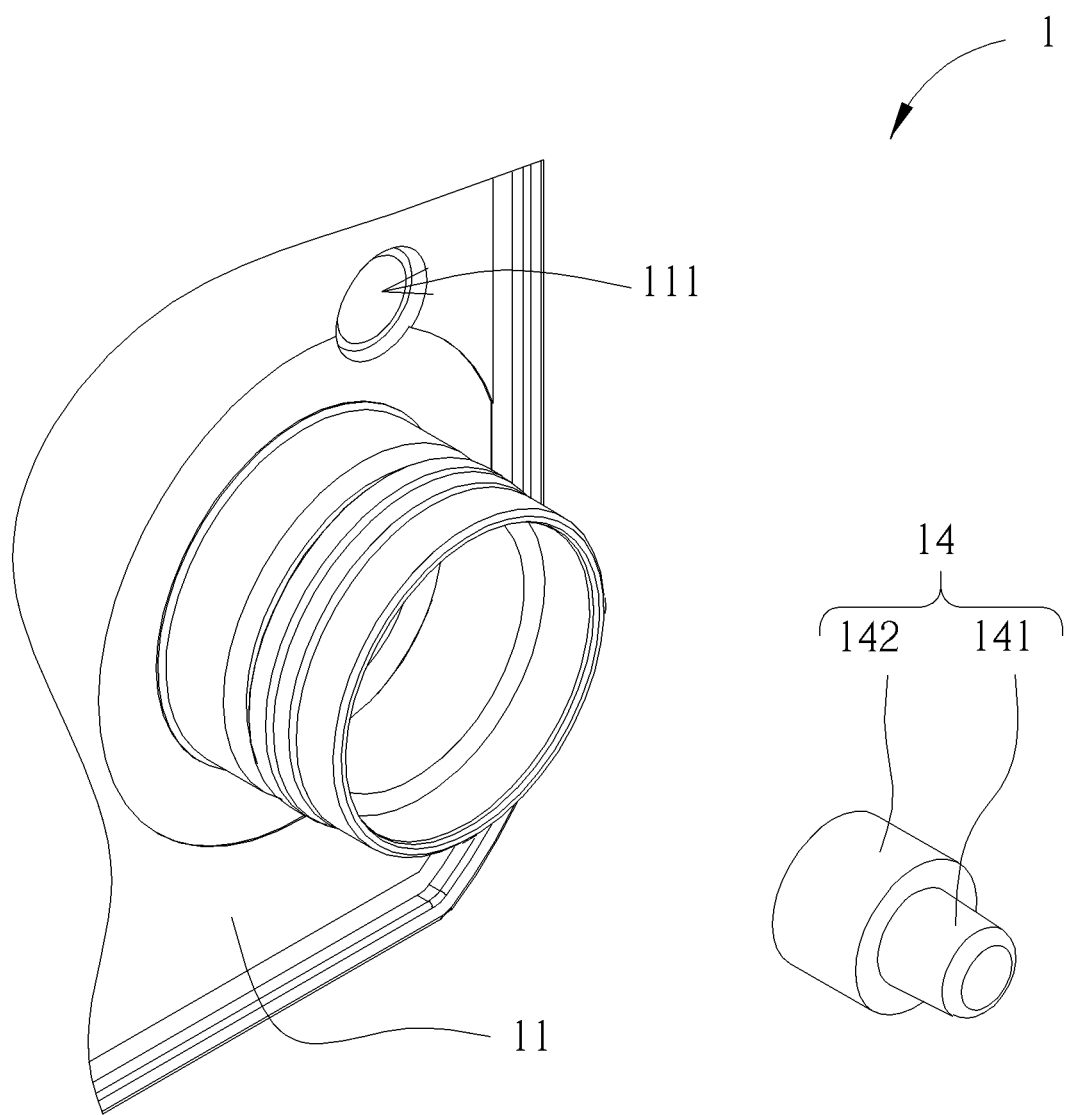
FIG. 3 is a partial exploded diagram of the electronic device according to the first embodiment of the present invention.
Figure 4:
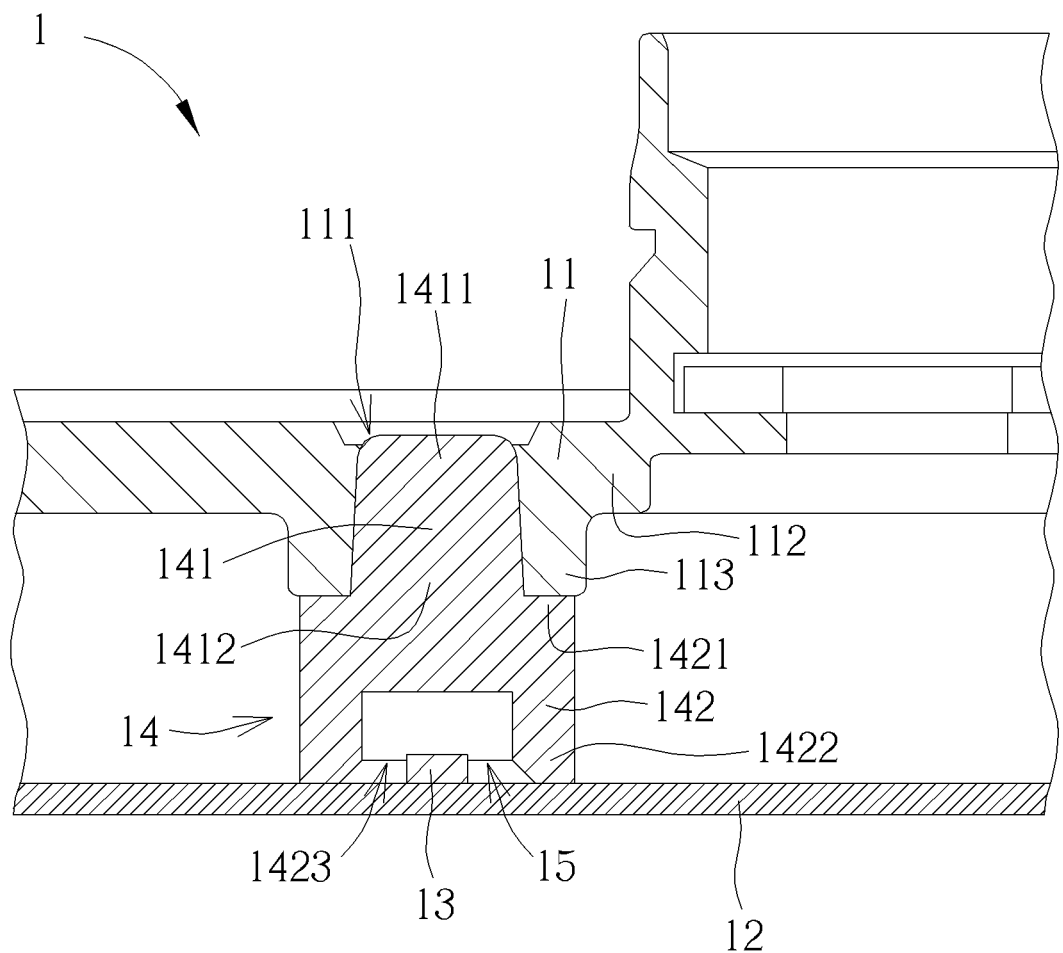
FIG. 4 is a partial internal structural diagram of the electronic device according to the first embodiment of the present invention.

Please refer to FIG. 1 to FIG. 4. FIG. 1 is a schematic diagram of an electronic device 1 according to a first embodiment of the present invention. FIG. 2 is a partial enlarged diagram of the electronic device 1 according to the first embodiment of the present invention. FIG. 3 is a partial exploded diagram of the electronic device 1 according to the first embodiment of the present invention. FIG. 4 is a partial internal structural diagram of the electronic device 1 according to the first embodiment of the present invention. As shown in FIG. 1 to FIG. 4, the electronic device 1 includes a case 11, a base plate 12, a light emitting component 13 and a light guiding column 14. A through hole 111 is formed on the case 11. The base plate 12 is disposed inside the case 11. The light emitting component 13 is disposed on the base plate 12. The light guiding column 14 is for guiding light emitted from the light emitting component 13 to the outside of the case 11. The light guiding column 14 includes a first end portion 141 and a second end portion 142 opposite to the first end portion 141. The first end portion 141 passes through the through hole 111 in a tight-fitting manner and is partially exposed out of the case 11. The second end portion 142 is clamped between the base plate 12 and the case 11 in a tight-fitting manner. A chamber 15 is formed between the second end portion 142 and the base plate 12. The light emitting component 13 is accommodated inside the chamber 15. In this embodiment, preferably, the base plate 12 can be a circuit board electrically connected to the light emitting component 13 and for driving the light emitting component 13 to emit the light.

Figure 5:
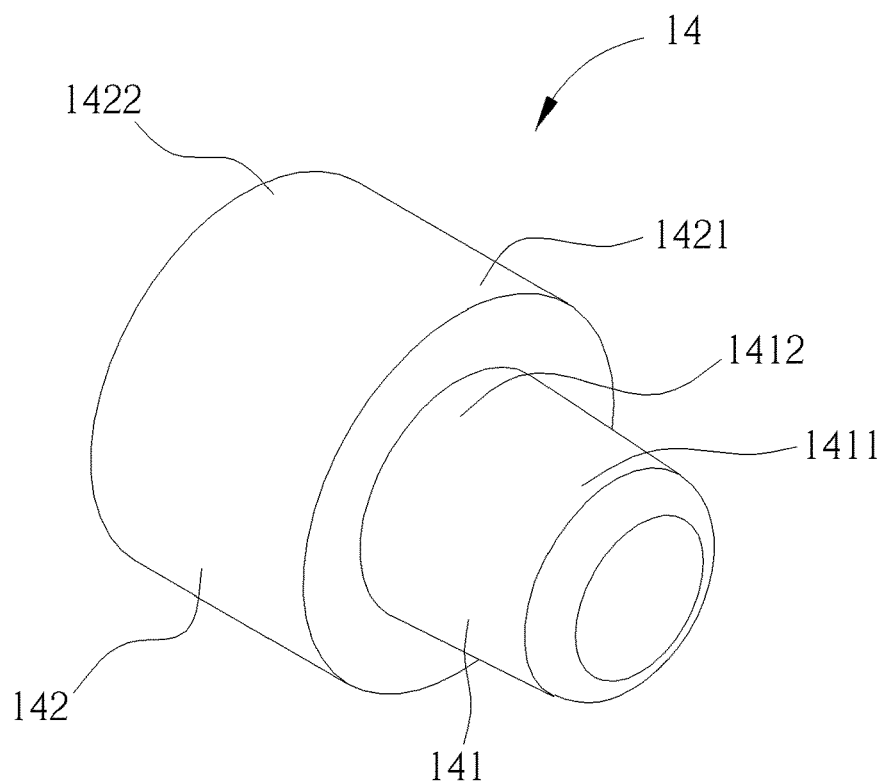
FIG. 5 and FIG. 6 are diagrams of a light guiding column at different views according to the first embodiment of the present invention.
Figure 6:
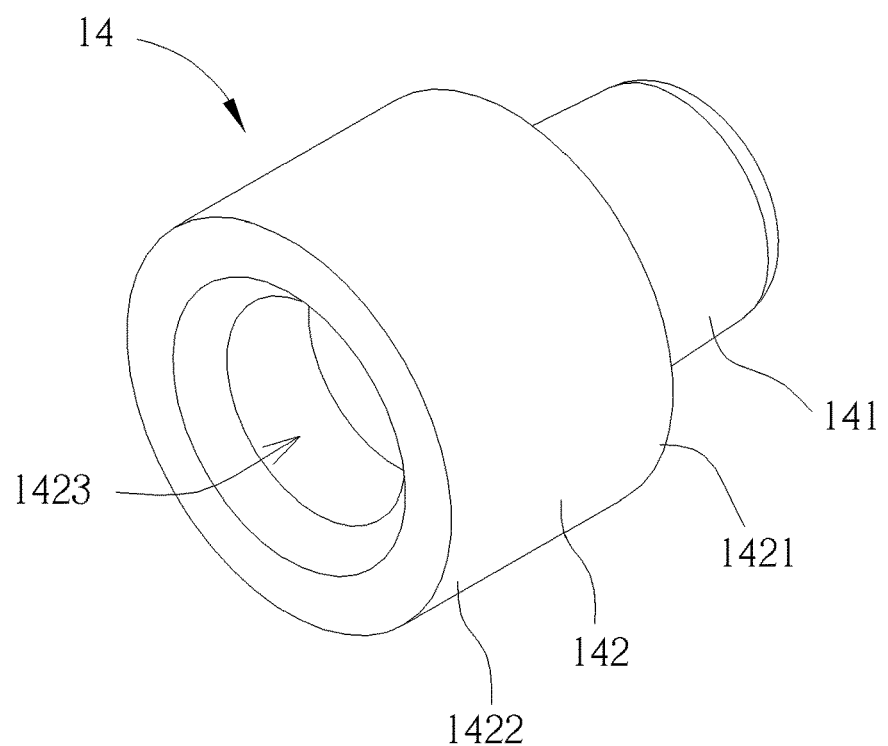
Figure 7:
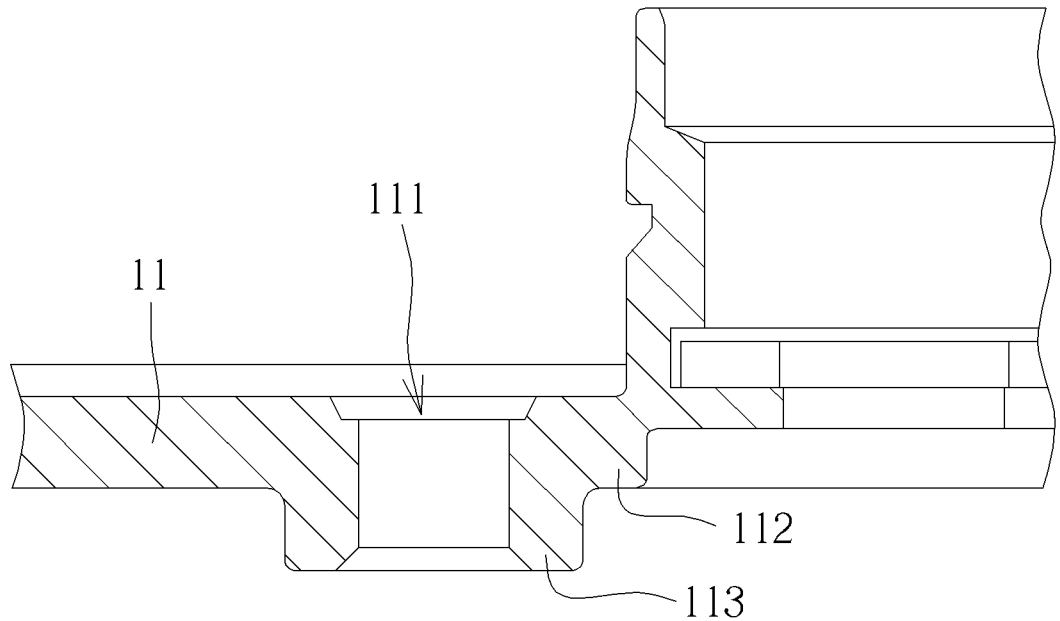
FIG. 7 is a partial diagram of a case according to the first embodiment.

Please refer to FIG. 1 to FIG. 7. FIG. 5 and FIG. 6 are diagrams of the light guiding column 14 at different views according to the first embodiment of the present invention. FIG. 7 is a partial diagram of the case 11 according to the first embodiment. As shown in FIG. 1 to FIG. 7, specifically, in this embodiment, in order to achieve the configuration of the first end portion 141 passing through the through hole 111 in the tight-fitting manner, the through hole 111 can be a straight hole which has a uniform inner diameter, and the inner diameter of the through hole 111 can be less than an outer diameter at least one portion of the first end portion 141. Furthermore, the first end portion 141 can be a truncated cone, i.e., a conical frustum. An outer diameter of a first portion 1411 of the first end portion 141 away from the second end portion 142 can be less than an outer diameter of a second portion 1412 of the first end portion 141 adjacent to the second end portion 142 for allowing the first end portion 141 to be inserted into the through hole 111 easily and for preventing the first end portion 141 from disengaging from the through hole 111. When the first end portion 141 of the light guiding column 14 is inserted into the through hole 111, an outer periphery of at least one portion of the first end portion 141 of the light guiding column 14 interferes with an inner periphery of at least one portion of the through hole 111 for preventing liquid, e.g., water, from entering into the case 11 through the through hole 111.

However, the present invention is not limited to this embodiment. Any structure or configuration which allows the outer periphery of the at least one portion of the first end portion of the light guiding column to interfere with the inner periphery of the at least one portion of the through hole to achieve tight fitting of the first end portion and the through hole for preventing the liquid from entering the case through the through hole, is included within the scope of the present invention. For example, in another embodiment, the through hole can be a straight hole, the first end portion can be a truncated cone, an outer periphery of a first portion of the first end portion does not interfere with an inner periphery of the through hole, and an outer periphery of a second portion of the second end portion interferes with the inner periphery of the through hole. Alternatively, in another embodiment, the through hole can be a straight hole, the first end portion can be a gourd-shaped structure, an outer periphery of a central portion of the first end portion does not interfere with an inner periphery of the through hole, and two portions of the first end portion located at two opposite sides of the central portion of the first end portion interferes with the inner periphery of the through hole. Alternatively, in another embodiment, the through hole can be a conical hole, an inner diameter of the through hole gradually decreases from inside to outside, the first end portion can be a circular column structure, an outer periphery of a first portion of the first end portion away from the second end portion interferes with an inner periphery of the through hole, and an outer periphery of the second portion of the first end portion adjacent to the second end portion does not interfere with the inner periphery of the through hole.

In order to achieve the configuration of the second end portion 142 clamped between the base plate 12 and the case 11 in the tight-fitting manner, in this embodiment, the second end portion 142 can be a cylinder abutting against the case 11 and the base plate 12 in the tight-fitting manner. Specifically, a protruding platform 113 protrudes from an inner side 112 of the case 11 adjacent to the base plate 12. The through hole 111 penetrates through the protruding platform 113. The protruding platform 113 and the base plate 12 respectively abut against a first abutting portion 1421 of the second end portion 142 and a second abutting portion 1422 of the second end portion 142 opposite to the first abutting portion 1421 of the second end portion 142, so that the second end portion 142 can be clamped by the case 11 and the base plate 12 for preventing the liquid from entering the case 11 through the through hole 111. However, the present invention is not limited to this embodiment. Any structure or configuration which allows the second end portion of the light guiding column to be clamped between the case and the base plate for preventing liquid from entering into the case through the through hole is included within the scope of the present invention. For example, in another embodiment, the protruding platform can be omitted, and the inner side of the case adjacent to the base plate and the base plate can respectively abut against the first abutting portion and the second abutting portion of the second end portion to clamp the second end portion by the case and the base plate.

In order to achieve formation of the chamber 15 between the second end portion 142 and the base plate 12 for accommodating the light emitting component 13, a notch structure 1423 is formed on a side of the second end portion 142 adjacent to the base plate 12, i.e., an abutting side of the second abutting portion 1422 abutting against the base plate 12. The notch structure 1423 and the base plate 12 cooperatively form the chamber 15 for accommodating the light emitting component 13 when the second end portion 142 abuts against the base plate 12. However, the present invention is not limited to this embodiment. For example, in another embodiment, an accommodating notch can be formed on the base, the abutting side of the second abutting portion abutting against the base plate can be a flat structure, and the flat structure and the accommodating notch can cooperatively form the chamber 15 for accommodating the light emitting component 13 when the second end portion 142 abuts against the base plate 12.

When the electronic device 1 is in a state as shown in FIG. 2, the tight-fitting configuration of the first end portion 141 and the through hole 111 can form a first waterproofing mechanism, and the tight-fitting configuration of the second end portion 142, the case 11 and the base plate 12 can form a second waterproofing mechanism. The aforementioned two waterproofing mechanisms can effectively prevent the liquid from entering into the case 11 through the through hole 111. Therefore, there is no need to dispose any waterproofing washer or waterproofing glue, which can achieve an effect of reducing manufacturing cost and difficulty in assembly.

Figure 8:
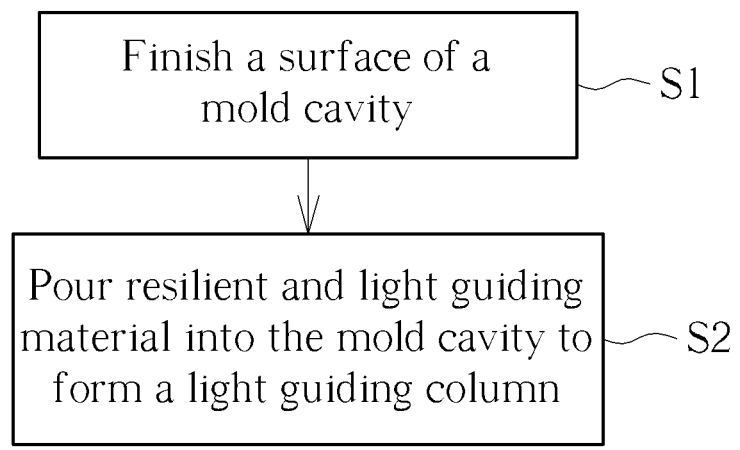
FIG. 8 is a flow chart diagram of a method of manufacturing the light guiding column according to the first embodiment.

Besides, please refer to FIG. 8. FIG. 8 is a flow chart diagram of a method of manufacturing the light guiding column 14 according to the first embodiment. As shown in FIG. 8, the method includes the following steps:

S1: Finish a surface of a mold cavity.
S2: Pour resilient and light guiding material into the mold cavity to form the light guiding column 14.

When it is desired to manufacture the light guiding column 14, the surface of the mold cavity can be finished (step S1) firstly, and then the resilient and light guiding material can be poured into the mold cavity to form the light guiding column 14 (step S2). A surface roughness of the surface of the mold cavity and a surface roughness of a surface of the formed light guiding column 14 can be decreased by finishing the surface of the mold cavity. Therefore, the surface of the formed light guiding column 14 is smoother, so that the first end portion 141 of the light guiding column 14 exposed out of the case 11 has an improved luminous transmittance for achieving an improved light guiding effect. In this embodiment, preferably, the surface of the mold cavity can be finished by a plating process, and the resilient and light guiding material can be silicone rubber. However, the present invention is not limited thereto. It depends on practical demands.

Figure 9:
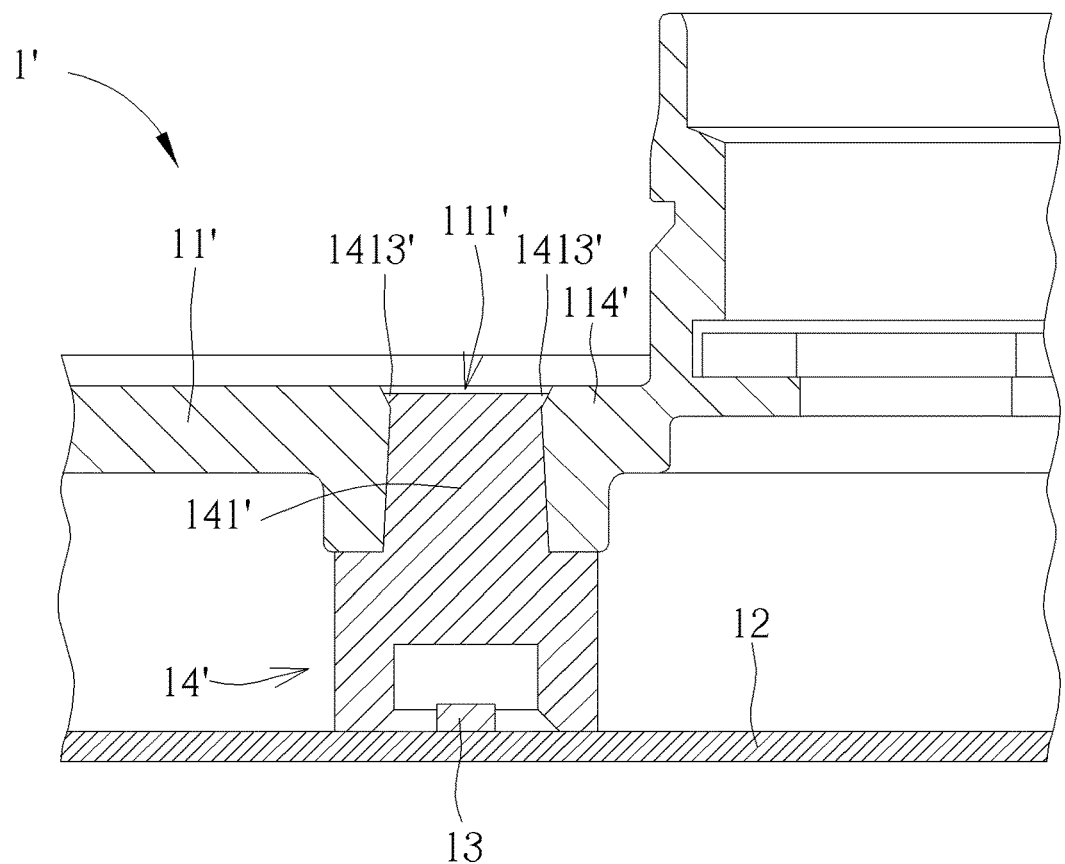
FIG. 9 is a partial internal structural diagram of an electronic device according to a second embodiment of the present invention.
Figure 10:
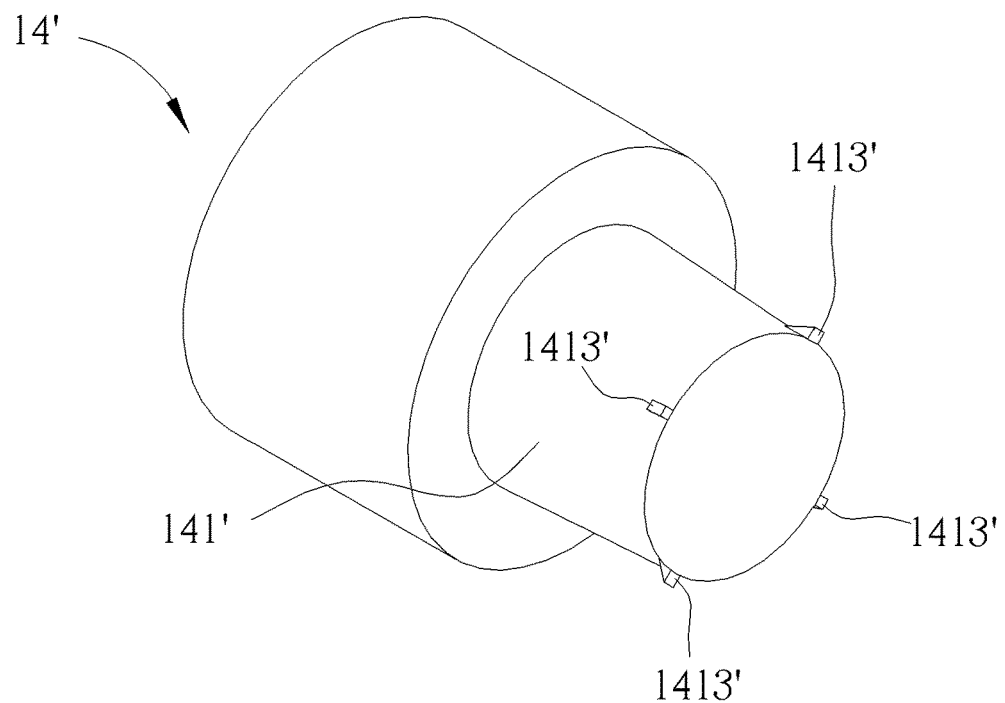
FIG. 10 is a diagram of a light guiding column according to the second embodiment of the present invention.

Please further refer to FIG. 9 and FIG. 10. FIG. 9 is a partial internal structural diagram of an electronic device 1' according to a second embodiment of the present invention. FIG. 10 is a diagram of a light guiding column 14' according to the second embodiment of the present invention. As shown in FIG. 9 and FIG. 10, different from the first embodiment, the electronic device 1' of this embodiment includes a case 11' and the light guiding column 14'. In order to prevent unintentional disengagement of the light guiding column 14' and a through hole 111' formed on the case 11', four abutting structures 1413' protrude from a first end portion 141' of the light guiding column 14'. The four abutting structures 1413' abut against an outer side 114' of the case 11' away from the base plate 12 for restraining movement of the light guiding column 14'. Preferably, each abutting structure 1413' can be a beveled edge. However, the present invention is not limited to this embodiment. The number and the configuration of the abutting structure protruding from the first end portion of the light guiding column are not limited to this embodiment. For example, in another embodiment, there can be only one abutting structure protruding from the first end portion of the light guiding column.

In contrast to the prior art, the present invention utilizes the light guiding column made of the resilient and light guiding material to pass through the through hole in the tight-fitting manner and to be clamped between the base plate and the case in the tight-fitting manner. Therefore, the present invention not only can guide the light emitted from the light emitting component to the outside of the case and prevent liquid, e.g., water, from entering into the case through the through hole but also can reduce manufacturing cost and difficulty in assembly because the present invention reduces an amount of components for assembly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light guiding column with a waterproofing function for guiding light emitted from a light emitting component to outside of a case, the light emitting component being disposed on a base plate, the base plate being disposed inside the case, the light guiding column comprising:

a first end portion passing through a through hole formed on the case in a tight-fitting manner, and no sealing component being disposed between the first end portion of the light guiding column and the through hole; and a second end portion opposite to the first end portion and clamped between the base plate and the case in a tight-fitting manner, a chamber being formed between the second end portion and the base plate, and the light emitting component being accommodated inside the chamber.

2. The light guiding column of claim 1, wherein at least one abutting structure protrudes from the first end portion of the light guiding column, and the at least one abutting structure abuts against an outer side of the case away from the base plate for restraining movement of the light guiding column.

3. The light guiding column of claim 1, wherein the second end portion abuts against the case and the base plate in a tight-fitting manner.

4. The light guiding column of claim 3, wherein a protruding platform protrudes from an inner side of the case adjacent to the base plate, the through hole penetrates through the protruding platform, and the protruding platform and the base plate respectively abut against a first abutting portion of the second end portion and a second abutting portion of the second end portion opposite to the first abutting portion of the second end portion, so that the second end portion is clamped by the case and the base plate.

5. The light guiding column of claim 1, wherein at least one portion of an outer periphery of the first end portion of the light guiding column interferes with at least one portion of an inner periphery of the through hole, so that the first end portion is disposed in the through hole in a tight-fitting manner.

6. The light guiding column of claim 5, wherein an outer diameter of a first portion of the first end portion away from the second end portion is less than an outer diameter of a second portion of the first end portion adjacent to the second end portion.

7. The light guiding column of claim 1, wherein the first end portion is a truncated cone, and the second end portion is a cylinder.

8. The light guiding column of claim 1, wherein a notch structure is formed on a side of the second end portion adjacent to the base plate, and the notch structure and the base plate form the chamber cooperatively.

9. The light guiding column of claim 1, wherein the light guiding column is made of resilient and light guiding material.

10. The light guiding column of claim 1, wherein the light guiding column is made of silicone rubber.

11. An electronic device comprising:
  a case;
  a base plate disposed inside the case;
  a light emitting component disposed on the base plate; and
  a light guiding column for guiding light emitted from the light emitting component to outside of the case, the light guiding column comprising:
    a first end portion passing through a through hole formed on the case in a tight-fitting manner, and no sealing component being disposed between the first end portion of the light guiding column and the through hole; and
    a second end portion opposite to the first end portion and clamped between the base plate and the case in a tight-fitting manner, a chamber being formed between the second end portion and the base plate, and the light emitting component being accommodated inside the chamber.

12. The electronic device of claim 11, wherein at least one abutting structure protrudes from the first end portion of the light guiding column, and the at least one abutting structure abuts against an outer side of the case away from the base plate for restraining movement of the light guiding column.

13. The electronic device of claim 11, wherein the second end portion abuts against the case and the base plate in a tight-fitting manner.

14. The electronic device of claim 13, wherein a protruding platform protrudes from an inner side of the case adjacent to the base plate, the through hole penetrates through the protruding platform, and the protruding platform and the base plate respectively abut against a first abutting portion of the second end portion and a second abutting portion of the second end portion opposite to the first abutting portion of the second end portion, so that the second end portion is clamped by the case and the base plate.

15. The electronic device of claim 11, wherein at least one portion of an outer periphery of the first end portion of the light guiding column interferes with at least one portion of an inner periphery of the through hole, so that the first end portion is disposed in the through hole in a tight-fitting manner.

16. The electronic device of claim 15, wherein an outer diameter of a first portion of the first end portion away from the second end portion is less than an outer diameter of a second portion of the first end portion adjacent to the second end portion.

17. The electronic device of claim 11, wherein a notch structure is formed on a side of the second end portion adjacent to the base plate, and the notch structure and the base plate form the chamber cooperatively.

18. A method of manufacturing a light guiding column, the method comprising:
  finishing a surface of a mold cavity; and
  pouring resilient and light guiding material into the mold cavity to form the light guiding column.

19. The method of claim 18, wherein finishing the surface of the mold cavity comprises:
  finishing the surface of the mold cavity by electroplating.

20. The method of claim 18, wherein pouring the resilient and light guiding material into the mold cavity to form the light guiding column comprises:
  pouring silicone rubber into the mold cavity to form the light guiding column.

* * * * *